United States Patent [19]

Kawamura

[11] Patent Number: 5,629,744
[45] Date of Patent: May 13, 1997

[54] ACTIVE MATRIX DISPLAY DEVICE AND TIMING GENERATOR

[75] Inventor: Akio Kawamura, Kanagawa, Japan

[73] Assignee: Sony Corporation, Tokyo, Japan

[21] Appl. No.: 424,058

[22] Filed: Apr. 19, 1995

[30] Foreign Application Priority Data

Apr. 22, 1994 [JP] Japan .................................. 6-107600

[51] Int. Cl.⁶ .................. H04N 3/14; H04N 9/30; H04N 5/46
[52] U.S. Cl. ............................. 348/792; 348/556
[58] Field of Search .................... 348/800, 266, 348/264, 792, 793, 445, 441, 454, 469, 790, 458, 791, 554, 555, 556, 558; H04N 5/44, 3/12, 7/01, 3/14, 9/30, 5/46

[56] References Cited

U.S. PATENT DOCUMENTS

| 4,694,348 | 9/1987 | Kamiya et al. . |
| 5,233,422 | 8/1993 | Kondo et al. . |

FOREIGN PATENT DOCUMENTS

| 0344621 | 12/1989 | European Pat. Off. . |
| 0408347 | 1/1991 | European Pat. Off. . |
| 0421428A2 | 4/1991 | European Pat. Off. . |
| 0456165 | 11/1991 | European Pat. Off. . |
| 0539033A1 | 4/1993 | European Pat. Off. . |
| 63246A2 | 1/1995 | European Pat. Off. .......... H04N 3/12 |
| 3720353 | 1/1989 | Germany . |
| 2191060 | 12/1987 | United Kingdom . |
| 2260058 | 3/1993 | United Kingdom ............ H04N 3/12 |

*Primary Examiner*—Michael Lee
*Attorney, Agent, or Firm*—William S. Frommer; Alvin Sinderbrand

[57] ABSTRACT an active matrix display device comprises a plurality of pixels, a vertical scanning circuit, a horizontal scanning circuit and a thinning-out circuit. The plurality of pixels are arranged in a matrix on a normal standard screen. The vertical scanning circuit is for sequentially selecting pixels every line. The horizontal scanning circuit is for writing single horizontal period portions of a wide standard image signal for selected lines of pixels and the thinning-out circuit is for controlling timing of the vertical scanning circuit sequential selection and thinning-out a prescribed number of horizontal period portions from a wide standard image signal in such a manner that wide displaying compressed in the longitudinal direction of the screen is carried out. It is therefore possible for a normal standard screen to change over to displaying a wide standard image.

4 Claims, 7 Drawing Sheets thinning-out period thinning-out period

ACTIVE MATRIX DISPLAY DEVICE AND TIMING GENERATOR

BACKGROUND OF THE INVENTION

1. Field of the Invention

The present invention relates to an active matrix display device, and more particularly to technology for taking as input and displaying a picture for an image signal obeying a wide standard having, for example, a 16:9 aspect ratio on an active matrix display device having a screen which obeys, for example, a normal standard having a 4:3 aspect ratio.

2. Description of Related Art

In recent years, the range of applications for active matrix display device employing liquid crystal display panels has increased in scope so as to include, for example, camera view-finders. Recent video cameras are capable of selectively designating aspect ratios for photographing which obey a normal standard (for example, an NTSC standard or PAL standard etc.) and aspect ratios for photographing which obey a wide standard (for example, a HDTV standard, etc.). However, active matrix display device having an aspect ratio obeying the usual normal standard are used as viewfinders.

If an image photographed at a wide standard aspect ratio is projected onto an active matrix display device having a normal standard aspect ratio, the picture is transformed so as to be extended in the vertical direction because the longitudinal dimensions of the picture are relatively compressed compared with the vertical dimensions. It is preferable for the photographed wide image to be displayed without modification even, for example, in the case of a video camera viewfinder. However, as the active matrix display device using the monitor has a usual normal standard aspect ratio, projection is not possible without modifying the picture.

When displaying a wide standard image as a normal standard picture, it is necessary to compress the image in the longitudinal direction. In this case, remaining portions occur at the top and bottom of the normal standard picture. In order that the entire picture is easy to see, it is preferable to show a dark level background at the remaining portions. A normal standard active matrix display device has 225 lines, in, for example, the case of a half-line structure. It is necessary to compress this to 169 horizontal lines in accordance with the aspect ratio dimensions for the case where a wide standard image is displayed. As an image signal for 169 horizontal lines is to be written in the time allotted to 225 lines, the time remaining to write a dark signal to the remaining portions is comparatively short. In this short time, 28×2=56 horizontal lines for the dark signal have to be written to the top and bottom. For example, as 225 horizontal lines are allotted in a half-line structure for the case of an NTSC standard where there are 262.5 scanning lines per field, a time corresponding to 37.5 horizontal scanning lines is provided as an overscanning period. In the case where the dark signal is written utilizing this overscanning period, a dark signal corresponding to 56 horizontal lines has to be written at the top and bottom in a period of time corresponding to 37.5 horizontal scanning lines. This period of time is therefore completely insufficient.

SUMMARY OF THE INVENTION

It is therefore an object of the present invention to provide an active matrix display device capable of displaying wide standard pictures on a normal standard display device without modification.

It is a further object of the present invention to provide an active matrix display device capable of writing a dark signal at high speed to remaining portions occurring at the top and bottom along the longitudinal direction of the screen when a wide standard image is shown on a normal standard screen.

According to the present invention, in order to achieve the aforementioned objects, an active matrix display device comprises a plurality of pixels, a vertical scanning circuit, a horizontal scanning circuit and a thinning-out circuit. The plurality of pixels are arranged in a matrix on a normal standard screen. The vertical scanning circuit is for sequentially selecting pixels every line. The horizontal scanning circuit is for writing single horizontal period portions of a wide standard image signal for selected lines of pixels and the thinning-out circuit is for controlling timing of the vertical scanning circuit sequential selection and thinning-out a prescribed number of horizontal period portions from the wide standard image signal in such a manner that wide displaying compressed in the longitudinal direction of the screen is carried out.

The active display device may further include a control circuit for controlling the horizontal scanning circuit and the vertical scanning circuit in such a manner that a dark signal is written to remaining portions left-over at the top and bottom of the screen during wide displaying at a higher speed than the speed of the image signal.

The control circuit may provide a high-speed clock signal at the time of writing the dark signal and drive the horizontal scanning circuit and vertical scanning circuit.

The control circuit may drive the horizontal scanning circuit at normal speed and sample a dark signal at signal lines connected to each row of pixels while the vertical scanning circuit is halted, and then drive the vertical scanning circuit at high speed and sequentially select and write a dark signal to a prescribed number of pixel lines.

The control circuit may drive the vertical scanning circuit at high speed and sequentially select and write a dark signal to a prescribed number of pixel lines while the horizontal scanning circuit is in a conducting state and simultaneously sample a dark signal at signal lines connected to each of the rows of pixels.

A timing generator, for providing timing signals to a vertical scanning circuit and a horizontal scanning circuit for driving pixels arranged in a matrix, comprises first, second and third timing circuits. The first timing circuit provides a first timing signal to the vertical scanning circuit and sequentially selects pixels at each line. The second timing circuit provides a second timing signal to the horizontal scanning circuit and writes single horizontal periods of a wide standard image signal for selected pixels. The third timing signal providing circuit provides a third timing signal to the vertical scanning circuit and controls the timing of the sequential selection and the thinning-out of a prescribed number of horizontal periods from a wide standard image signal.

The active matrix display device may further comprise a control circuit for controlling in an irregular manner the horizontal scanning circuit and the vertical scanning circuit so that a dark signal is written to remaining portions left-over at the top and bottom of the longitudinal direction of the screen at a faster speed than the speed of the image signal when wide displaying.

A vertical thinning-out technology is applied to an active matrix display device having a screen in accordance with, for example, a normal standard of an aspect ratio of 4:3 and wide displaying of an aspect ratio of, for example, 16:9 is achieved. When a screen of aspect ratio 4:3 is used for wide displaying of an aspect ratio of 16:9, a dark signal mixed with the image signal is written using vertical high-speed scanning to the remaining portions (blank portions) occurring at the top and bottom of the screen.

DETAILED DESCRIPTION OF THE PREFERRED EMBODIMENTS

First Embodiment

Figure 1:
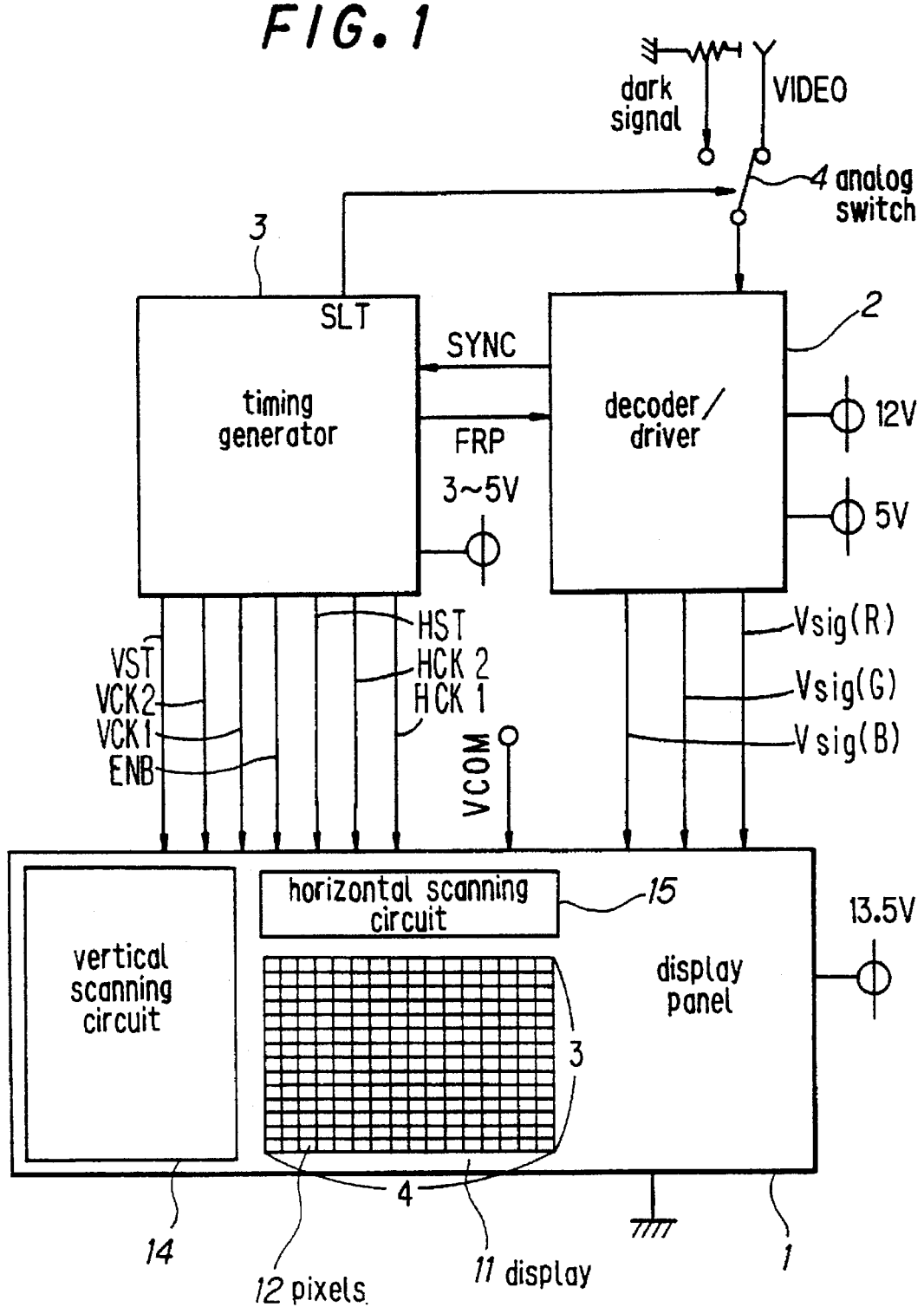
FIG. 1 is a block diagram showing the overall structure of an active matrix display device for the present invention.

The following is a detailed description, with reference to the diagrams, of an appropriate embodiment of the present invention. FIG. 1 is a block diagram showing the basic construction of an active matrix display device for the present invention. As shown in the drawing, this active matrix display device is equipped with a display panel 1, a decoder/driver 2 and a timing generator 3. The display panel 1 is equipped with a screen 11 which obeys a normal standard (in this example, an aspect ratio of 4:3). A multiplicity of pixels 12 are arranged in a matrix at the screen 11. Wide displaying is carried out at the screen 11 when a wide standard (in this example, an aspect ratio of 16:9) image signal Vsig is inputted at the display panel 1. In this example, the display panel 1 is a full color type, which takes as input the image signal Vsig. This image signal Vsig is divided up between each of the primary colors red, green and blue. The display panel 1 is equipped with a vertical scanning circuit 14 for sequentially selecting single line portions of pixels and a horizontal scanning circuit 15 for writing single horizontal period portions of the wide standard image signal Vsig for selected single lines of pixels 12. Further, a thinning-out means is incorporated in the horizontal scanning circuit 14 so that timing of sequential selection is controlled and a prescribed number of horizontal portions are thinned out from the wide standard image signal Vsig. This makes wide displaying compressed in the longitudinal direction of the screen possible. The display panel is powered by, for example, a 13.5 V power supply voltage.

A decoder/driver 2 has a decoder part which is powered by a 5 V power supply and a driver part which is powered by a 12 V power supply. The decoder part decodes an externally inputted composite video signal VIDEO and extracts a luminance signal and a chrominance signal. A synchronization signal SYNC separated from the composite video signal VIDEO is transmitted to the side of the timing generator 3. The image signal Vsig which is alternated in response to an inversion signal FRP inputted from the timing generator 3 is split up with regards to each of the colors red, green and blue, and is provided to the side of the display panel 1.

The timing generator 3 carries out timing control so as to generate various timing signals based on the synchronization signal SYNC and provide these signals to the display panel 1. i.e. a first timing signal (vertical start signal VST, and vertical clock signals VCK1 and VCK2) is provided to the vertical scanning circuit 14 and a single line portion of pixels is sequentially selected. Also, a second timing signal i.e. the horizontal start signal HST, horizontal clock signal HCK1 or the horizontal clock signal HCK2, is provided to the horizontal scanning circuit 15, and a single horizontal period portion of the wide standard image signal Vsig is written for the selected single line of pixels 12. Further, a thinning-out signal ENB is provided to the vertical scanning circuit 14 as the third timing signal, the timing of the sequential selection is controlled, a prescribed number of horizontal period portions are thinned out from the wide standard image signal Vsig, and wide displaying compressed in the longitudinal direction of the screen is carried out. In addition, this timing generator 3 has means for irregularly controlling the horizontal scanning circuit 15 and/or the vertical scanning circuit 14 so that a dark signal can be written for all of the remaining portions at the top and bottom of the screen 11 in the longitudinal direction when wide displaying, at a faster speed than that of the image signal Vsig.

In this example, a dark signal is pre-mixed with the image signal Vsig and provided to the display panel 1. The timing generator outputs a select signal SLT for controlling the composition of the video signal and the dark signal. This select signal is made based on the select signal SLT and the synchronization signal SYNC and, for example, outputted within a horizontal period based on an overscanning period. An analog switch provided on the input side of the decoder/driver 2 opens and closes in response to the select signal SLT so as to change over between inputting the video signal VIDEO and the dark signal to the decoder driver 2.

Figure 2:
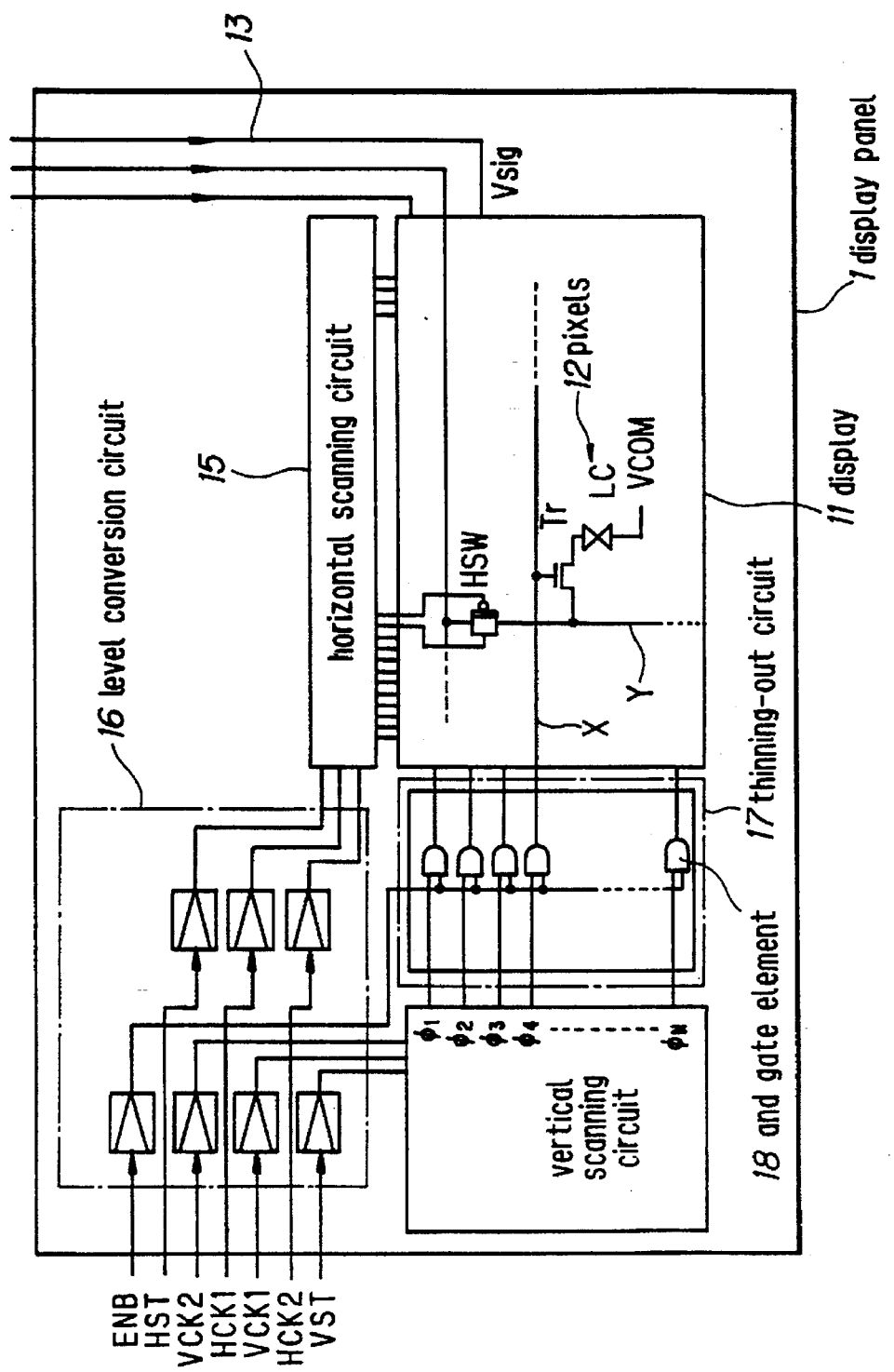
FIG. 2 is a block diagram showing an example of a display panel incorporated into the active matrix display device shown in FIG. 1.

FIG. 2 is a block diagram showing an example of a specific structure for the display panel shown in FIG. 1. As described previously, the display panel 1 is equipped with a screen 11, and innumerable pixels 12 are arranged in an array. In this example, only one pixel 12 is shown for the sake of simplicity. This pixel 12 is constituted by a minute liquid crystal cell LC. Rows of gate lines X and columns of signal lines Y are arrayed so as to cross each other. The various pixels 12 are then arranged at the points where the two parties cross. A thin-film transistor Tr to be used for switch-driving is also integratedly formed. The gate electrode of the thin film transistor Tr is connected to a corresponding gate line X, the source electrode is connected to a corresponding signal line Y and the drain electrode is connected to a corresponding end of the liquid crystal cell LC. The other end of the liquid crystal cell LC is connected to an opposing electrode and a desired opposing voltage VCOM is applied. Each gate line X is connected to the vertical scanning circuit 14. On the other hand, each signal line Y is connected to the video line 13 via the horizontal switch HSW so that the supplied image signal Vsig can be received. Each horizontal switch HSW is controlled so as to be opened and closed by the horizontal scanning circuit 15.

The vertical scanning circuit 14 operates based on the signals VST, VCK1 and VCK2 inputted via the level conversion circuit 16. i.e. the vertical scanning circuit 14 sequentially transfers a vertical start signal VST in accordance with vertical clock signals VCK1 and VCK2 which are of opposite phase and generates for each stage and outputs to each gate line X selection pulses $\Phi_1, \Phi_2, \ldots, \Phi_N$. The thin-film transistor Tr opens and closes in response to this gate pulse $\Phi$ and a line of image pixels 12 is sequentially selected.

On the other hand, the horizontal scanning circuit 15 operates in response to the signals HST, HCK1 and HCK2 inputted via the same level conversion circuit 16. i.e. the horizontal scanning circuit 15 sequentially transfers a horizontal start pulse HST in accordance with horizontal clock signals HCK1 and HCK2 which are of opposite phase, and outputs a sampling pulse. A horizontal switch HSW is controlled to open and close in accordance with this sampling pulse and the image signal Vsig provided via the video line 13 is sampled at each of the signal lines Y. The sampled image signal Vsig is written to the liquid-crystal pixels 12 via the thin-film transistor Tr which is in a conducting state. i.e. the horizontal scanning circuit 15 gradually writes in a horizontal period of the image signal Vsig for the selected line of pixels 12.

The present invention is characterized by a vertical scanning circuit 14 and a thinning-out circuit 17 being provided between the display panel 1. In this example, this thinning out circuit 17 is constituted by two input/one output AND gate elements 18 provided at each of the stages for the gate lines X. The output of each AND gate element 18 is connected to a corresponding gate line X. Also, one of the input terminals of the AND gates 18 is connected to a corresponding stage of the vertical scanning circuit 14. The other input terminal of the AND gates 18 receives a thin-out signal ENB provided via the level conversion circuit 16.

Figure 3:
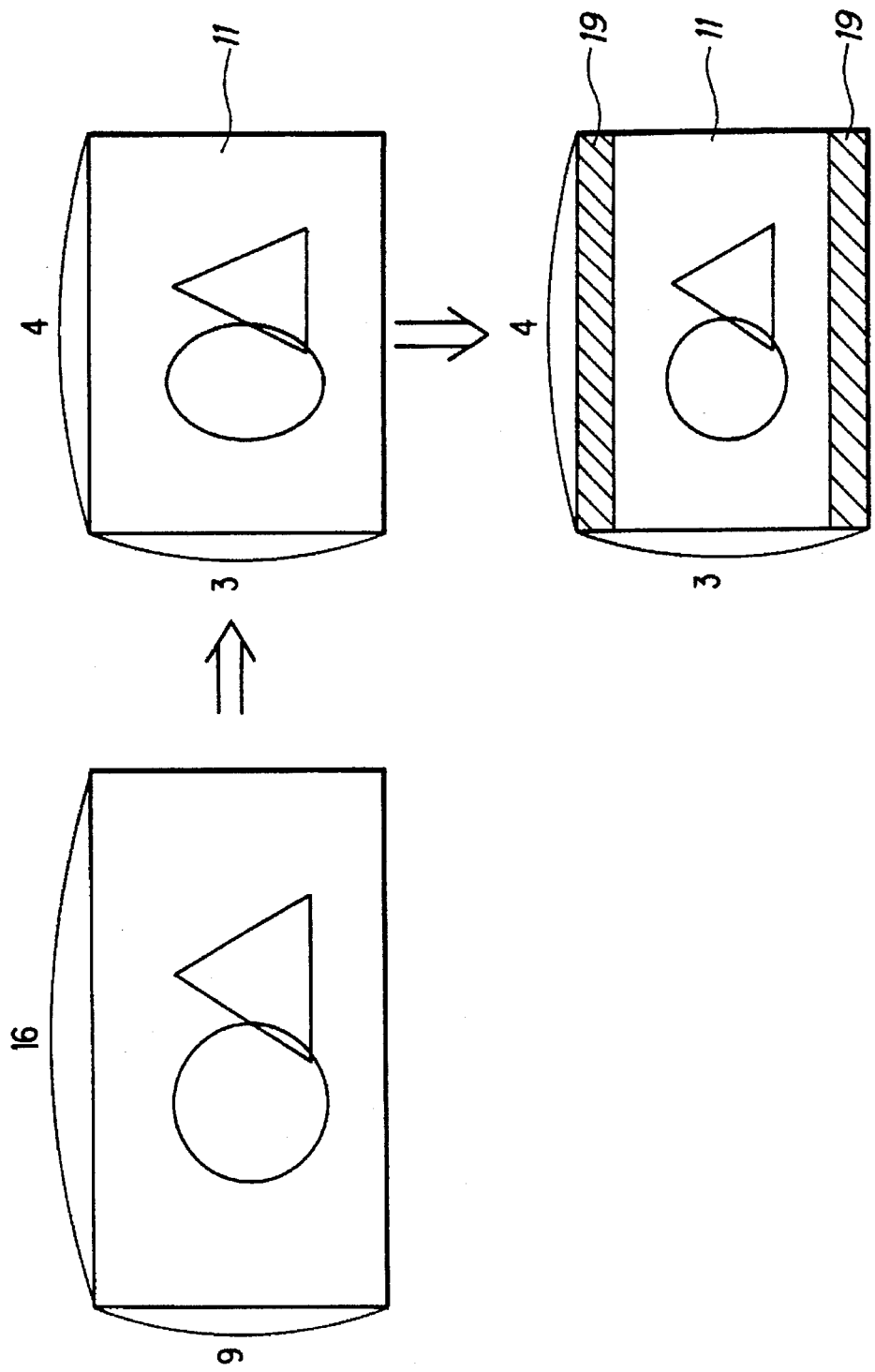
FIG. 3 is a scale drawing for describing the operation of the active matrix display device shown in FIG. 1.

Next, the overall operation of the active matrix display device shown in FIG. 1 is described with reference to FIG. 3. In the present invention, the video signal VIDEO inputted externally to the decoder/driver 2 obeys the wide standard for HDTV etc., and includes image information having an aspect ratio of 16:9. However, the screen 11 provided at the display panel 1 has an aspect ratio of 4:3. If it is supposed that the video signal VIDEO is inputted to the display panel without modification after decoding, an image elongated in the longitudinal direction of the screen is displayed. To resolve this point, in the present invention, a prescribed number of horizontal period portions are thinned out from the wide standard image signal Vsig by the aforementioned thinning-out circuit 17 and wide displaying which has been compressed in the longitudinal direction of the screen 11 is carried out. This is to say that the active matrix display device of the present invention is equipped with a vertical scanning thinning-out function and the image can be compressed to 75% in the vertical direction by thinning out one horizontal line in four. The thinning-out is at a rate of one in three in the case of the PAL standard.

When the image is compressed in the longitudinal direction, a remaining portion occurs at the top and the bottom of the screen 11. These portions are written with a dark signal via a high-speed vertical scan. For example, when the screen is of an NTSC standard half-line construction, 225 horizontal lines are included. If one line of every four is thinned out, the overall remaining part 19 at the top and bottom includes 56 horizontal lines. As the 169 horizontal lines which make up the image have to be written in the time allotted to the 225 lines, there is little time remaining for writing the image signal. For example, in the case of the NTSC standard, 262.5 scanning lines are included per field but 37.5 are taken for the overscanning period, which is excluded from the actual time for writing the image signal. Writing for 56 horizontal lines therefore has to be carried in the overscanning period corresponding to 37.5 lines. In order to overcome this, in the present invention, the dark signal for the overall remaining part 19 is written at a speed which is higher than that of the image signal.

Figure 4:
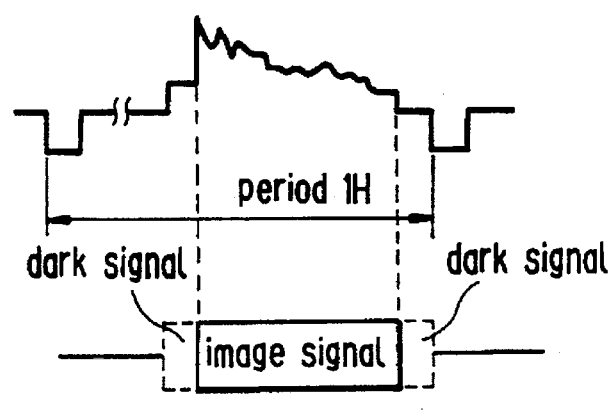
FIG. 4 is a descriptional view showing an operation for mixing an image signal and a dark signal.

Next, the operation of mixing the image signal and the dark signal, the vertical scanning thinning-out operation, and the dark signal high-speed writing operation will be described in detail with reference to FIG. 4 through to FIG. 10. FIG. 4 is a scale drawing expressing the operating conditions of the analog switch 4 shown in FIG. 1. As shown in the drawing, an actual image signal waveform is provided to one of the input terminals of the analog switch 4 within a single horizontal period (1H). A fixed level dark signal made using a resistance divider etc. is inputted to the other input terminal of the analog switch 4. The analog switch 4 is controlled to be opened and closed in accordance with the select signal SLT outputted from the timing generator 3 so that a dark signal is inserted into both sides of the actual image signal waveform. The dark signal is therefore inserted during the overscanning period.

Figure 5:
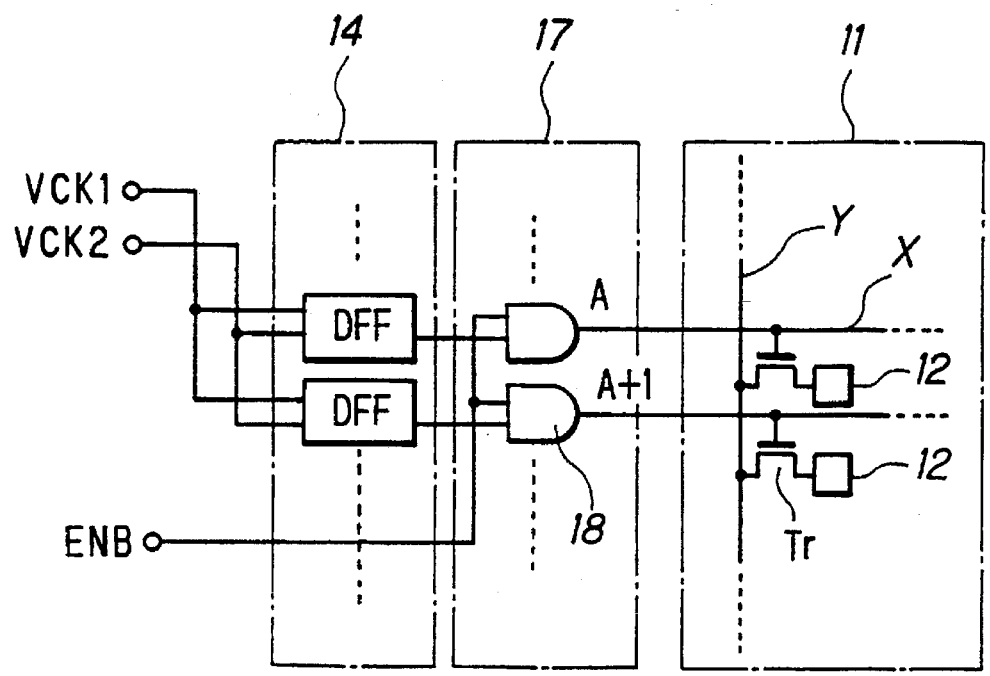
FIG. 5 is a circuit diagram for describing a thinning-out operation.

FIG. 5 shows an example of a specific structure of the vertical scanning circuit 14 shown in FIG. 2. As shown in the drawing, the vertical scanning circuit 14 is constituted by multi-stage connected D-type flip-flops (hereinafter referred to as DFF's). For ease of understanding, only DFF's corresponding to the Ath stage and the A+1th stage are shown in the drawing. As mentioned above, the vertical scanning circuit 14 transfers the vertical start signal to each stage in accordance with the vertical clock signals VCK1 and VCK2 and outputs select pulses. In this example, the thinning-out circuit 17 is inserted between the vertical scanning circuit 14 and the screen 11. As described above, this thinning-out circuit 17 is constituted by AND gate elements 18 provided so as to correspond to each stage. A pulse from a corresponding DFF is inputted to one of the input terminals of each AND gate element 18 and a thinning-out signal ENB is provided to the other input terminal. Also, the output terminal of an AND gate element 18 is connected to a corresponding gate line X.

Figure 6:
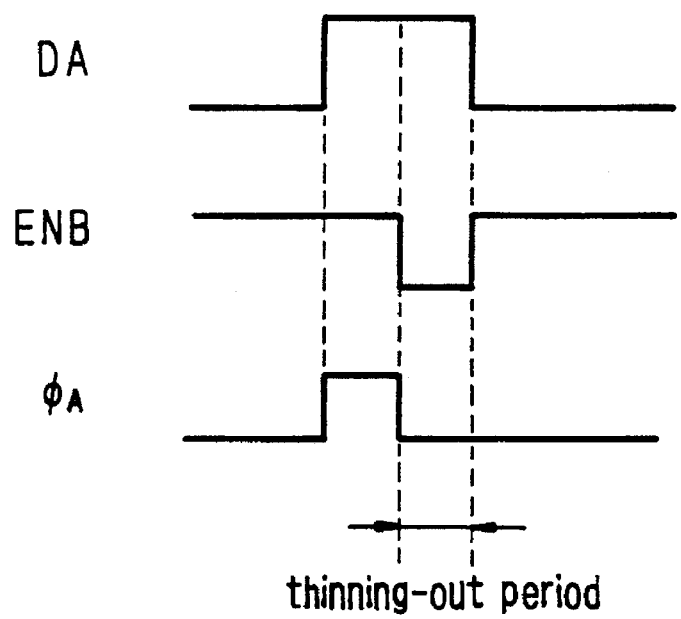
FIG. 6 is a wave diagram for describing the thinning-out operation.

Next, the operation of the structure shown in FIG. 5 is described with reference to FIG. 6. When the vertical start signal is transferred to the Ath DFF, VCK1 and VCK2 are temporarily halted and a pulse DA having a width 2H is outputted from the Ath DFF. In synchronization with this, a low active thinning-out signal ENB is inputted to the AND gate elements 18. The effect of this is that the potential of the gate line X corresponding to the Ath stage becomes that of the earth level. The vertical scanning is temporarily halted only for a period 1H due to this operation. This is the thinning-out period.

Figure 7:
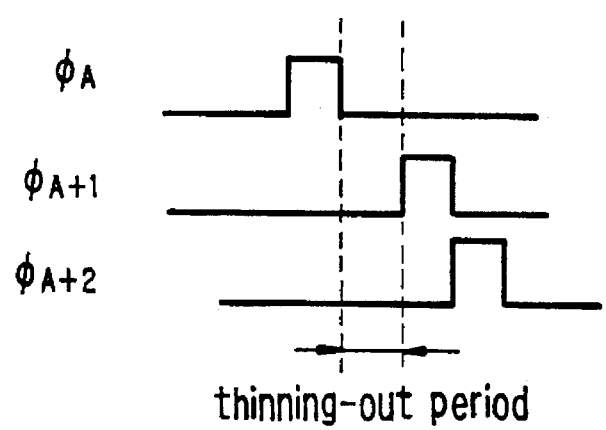
FIG. 7 is a timing chart for describing the same thinning-out operation.

FIG. 7 is a timing chart showing the waveform of the selection pulse sequentially outputted from the vertical scanning circuit 14. As described above, vertical scanning is halted for a period 1H after the selection pulse $F_A$ is outputted from the Ath stage and thinning out is carried out. During this time, the image signal transfer is blank and nothing is written on the screen. After the drawing-out period has elapsed, the selection pulse $F_{A+1}$ for the next stage is outputted. In this way, the image signal can be thinned out by temporarily halting the vertical scanning at a rate of one in four.

Figure 8:
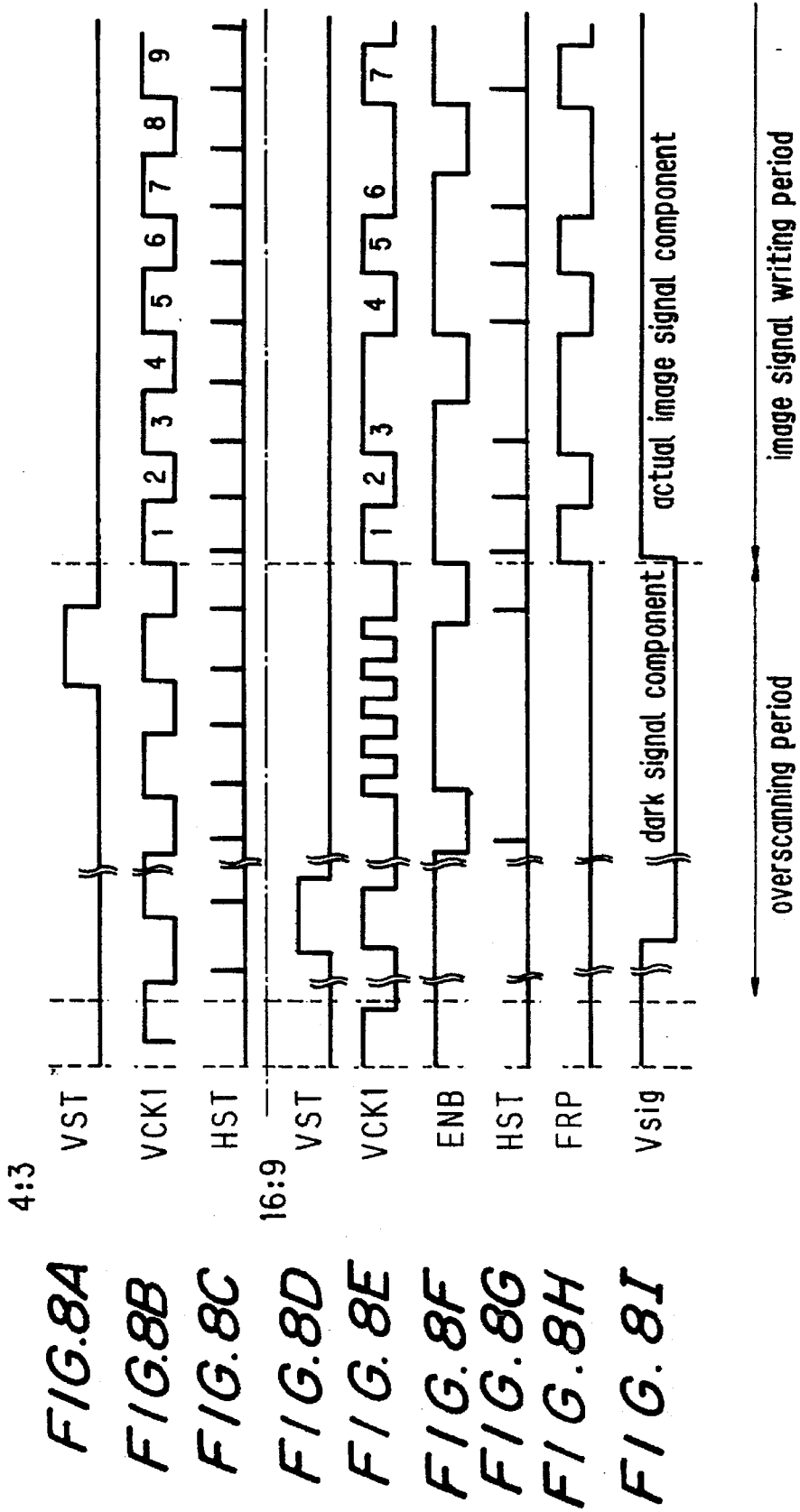
FIG. 8 is a timing chart for describing the dark signal high-speed writing operation.

FIG. 8 is a timing chart showing the image signal writing operation. The writing operation for normal displaying at an aspect ratio of 4:3 is described so that the present invention may first be more easily understood. After a prescribed overscanning period has elapsed, a vertical start signal VST from the timing generator is inputted to the vertical scanning circuit 14. This vertical start signal VST is sequentially transferred every 1H period in synchronization with the vertical clock signal VCK1 and the selection pulse is outputted. Single horizontal period portions of the image signal corresponding to a line portion of pixels can therefore be sequentially written in synchronization by inputting the horizontal start signal H from the timing generator to the horizontal scanning circuit 15 every 1H period.

On the other hand, when wide displaying at an aspect ratio of 16:9, first, the input timing of the vertical start signal VST is shifted to the head of the overscanning period. At this time, the clock signal VCK1 has not yet been provided and the vertical scanning circuit 14 is held in a halted state. Next, the thinning out signal ENB goes low active and the horizontal start signal HST is inputted to the horizontal scanning circuit on the initial period 1H. As a result of this, the dark signal component included in the image signal Vsig is sampled at each signal line. i.e. the capacitance component of each signal line is charged. However, as the vertical scanning circuit is halted, the sampled dark signal component is not written to the pixels. The signal line capacitance component is large when compared with the capacitance component of the pixels. Next, when the thinning-out signal ENB returns to a high level for 2H to 4H, the vertical scanning circuit 14 is driven at a high speed and the dark signal component is written to three lines of pixels while the horizontal scanning circuit 15 is halted with HST remaining low. For this purpose a vertical clock signal VCK1 which is twice or three times as fast is to be inputted to the vertical scanning circuit 14. It is therefore preferable to only drive the vertical scanning circuit temporarily at a high speed so that normal operation of the horizontal scanning circuit 15 can be concluded using this kind of dark signal component writing operation. Only having to make the vertical scanning circuit 14 high speed when compared with the horizontal scanning circuit 15 is a desirable situation as this means that the load on the circuit side is reduced.

A dark signal component is written every three horizontal lines and the aforementioned vertical scanning thinning-out is carried out within the image signal writing period after the overscanning period has passed. i.e. VCK1 is halted one time per 4H period. Vertical scanning is therefore interrupted because the thinning-out signal ENB goes low for a 1H period only. An image signal component which is actually blank is transferred during this 1H period. The inversion signal FRP is synchronized with the timing of the thinning-out. Reliable 1H period inversion driving is therefore possible after thinning out.

Figure 9:
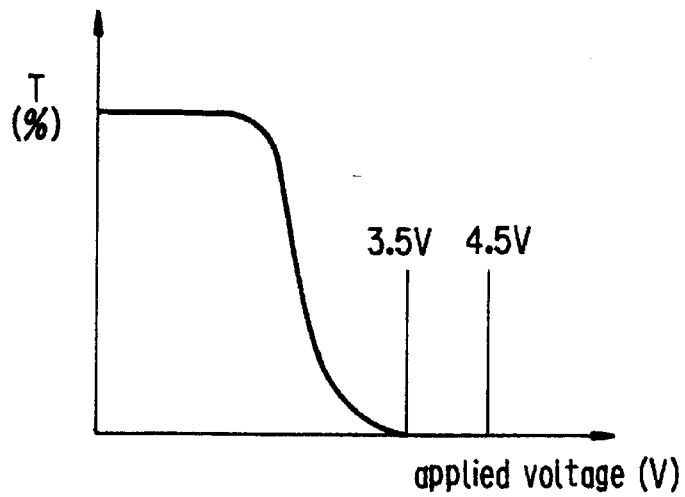
FIG. 9 is a graph showing the relationship between the applied voltage and the transmission rate, for a display panel.

In this way, this embodiment utilizes the capacitance of the signal lines which form the display panel being much larger when compared with the capacitance of the pixel capacity and holds the signal line by sampling the temporary dark signal. After this, while the sampling is halted, just the vertical scanning circuit is driven at a high speed and a dark signal is written to a number of lines of pixels. During this time, the loads accumulated at the signal line is reduced as following stage pixels are moved onto. However, as shown in FIG. 9, the relationship between the transmission rate T and the applied voltage V is non-linear for display panels utilizing liquid crystals. As a result, having a low applied voltage makes no difference to the dark display portion.

Second Embodiment

Figure 10:
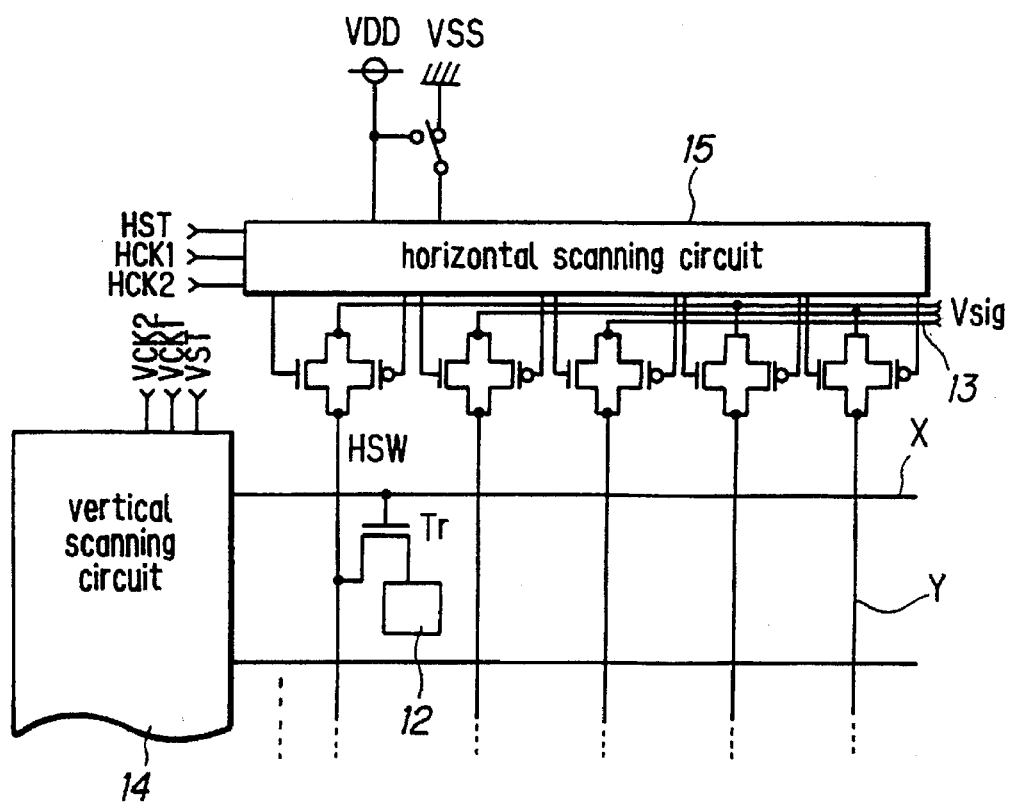
FIG. 10 is a circuit diagram showing another example of a structure for the display panel shown in FIG. 2.

FIG. 10 shows a further embodiment suitable for high-speed writing of a black color signal. Portions corresponding to portions of the structure in FIG. 2 are given the same reference numerals for ease of understanding. In this example, the vertical scanning circuit 14 is driven at a high speed. A prescribed number of pixel lines are sequentially selected and a dark signal is written while the horizontal scanning circuit 15 is turned on so that dark signals at signal lines Y connected to each row of pixels 12 are simultaneously sampled. Specifically, the horizontal switch HSW controlled to be opened and closed by the horizontal scanning circuit 15 is constructed from a transmission gate comprising an N-channel thin-film transistor and a P-channel thin film transistor. An image signal Vsig including a dark signal component is provided to each transmission gate via a video line 13. By connecting the earth connection terminals of the horizontal scanning circuit 15 temporarily to the power supply terminal, the N-channel transistors forming each of the transmission gates and all of the HSW's go on simultaneously. In this way, a dark signal line is provided to all of the signal lines Y. Under these conditions, the frequency of VCK1 and VCK2 is raised, the vertical scanning circuit 14 is driven at a high speed and a dark signal is sequentially written to a prescribed number of pixel lines. In this embodiment, it is no longer necessary to drive the horizontal scanning circuit normally while the dark signal is being written. In this way, a marked reduction can be achieved in the load on the circuit side.

A method may also be adopted where high speed clock signals are supplied to both the horizontal scanning circuit 15 and the vertical scanning circuit 14 using, for example, the circuit shown in FIG. 10 when a dark signal is written at high speed. In this case, the system clock of the timing generator 3 shown in FIG. 1 may be made twice or three times as fast and the frequency of the horizontal clock signals HCK1 and HCK2 and the vertical clock signals VCK1 and VCK2 may be raised. However, in this case, the load on the side of the horizontal scanning circuit 15 in particular is increased.

[Effects of the Invention]

As described above, according to the present invention, by applying vertical thinning-out to an active matrix display device having a normal standard screen, wide displaying can easily be achieved in a simple manner. It therefore becomes possible to have a normal display and a wide display electrically changed over without complicating the circuit structure. Also, when wide displaying is carried out on a normal standard screen, a dark signal is shown at the remaining portions occurring at the top and bottom by using vertical scanning. A driving method may therefore be provided in which, by exerting high-speed control on just the vertical scanning circuit, the load on the display panel does not increase.

What is claimed is:

1. An active matrix display device comprising:

a plurality of pixels arranged in a matrix on a normal standard screen;

a vertical scanning circuit for sequentially selecting pixels every line;

a horizontal scanning circuit for writing single horizontal period portions of a wide standard image signal for selected lines of pixels;

a thinning-out circuit for controlling timing of sequential selection by the vertical scanning circuit and thinning-out a prescribed number of horizontal period portions from the wide standard image signal in such a manner that wide displaying compressed in the longitudinal direction of the screen is carried out; and a control circuit for controlling the horizontal scanning circuit and the vertical scanning circuit in such a manner that a dark signal is written to portions left-over at the top and bottom of the screen during wide displaying at a higher speed than the speed of the image signal, wherein the control circuit provides a high-speed clock signal at the time of writing the dark signal and drives the horizontal scanning circuit and vertical scanning circuit.

2. An active matrix display device comprising:

a plurality of pixels arranged in a matrix on the normal standard screen;

a vertical scanning circuit for sequentially selecting pixels every line;

a horizontal scanning circuit for writing single horizontal period portions of a wide standard image signal for selected lines of pixels;

a thinning-out circuit for controlling timing of sequential selection by the vertical scanning circuit and thinning-out a prescribed number of horizontal period portions from the wide standard image signal in such a manner that wide displaying compressed in the longitudinal direction of the screen is carried out; and a control circuit for controlling the horizontal scanning circuit and the vertical scanning circuit in such a manner that a dark signal is written to portions left-over at the top and bottom of the screen during wide displaying at a higher speed than the speed of the image signal.

wherein the control circuit drives the horizontal scanning circuit at normal speed and samples a dark signal at signal lines connected to each row of pixels while the vertical scanning circuit is halted, and then drives the vertical scanning circuit at high speed to sequentially select a prescribed number of pixel lines and write a dark signal thereto.

3. An active matrix display device comprising:

a plurality of pixels arranged in a matrix on a normal standard screen;

a vertical scanning circuit for sequentially selecting pixels every line;

a horizontal scanning circuit for writing single horizontal period portions of a wide standard image signal for selected lines of pixels;

a thinning-out circuit for controlling timing of sequential selection by the vertical scanning circuit and thinning-out a prescribed number of horizontal period portions from the wide standard image signal in such a manner that wide displaying compressed in the longitudinal direction of the screen is carried out; and a control circuit for controlling the horizontal scanning circuit and the vertical scanning circuit in such a manner that a dark signal is written to portions left-over at the top and bottom of the screen during wide displaying at a higher speed than the speed of the image signal, wherein the control circuit drives the vertical scanning circuit at high speed and sequentially selects, and writes a dark signal to, a prescribed number of pixel lines while the horizontal scanning circuit is in a conducting state and simultaneously sampling a dark signal at signal lines connected to each of the rows of pixels.

4. A timing generator for providing timing signals to a vertical scanning circuit and a horizontal scanning circuit for driving pixels arranged in a matrix, comprising:

means for providing a first timing signal to the vertical scanning circuit and sequentially selected pixels at each line;

means for providing a second timing signal to the horizontal scanning circuit and writing single horizontal periods of a wide standard image signal for selected pixels;

means for providing a third timing signal to the vertical scanning circuit controlling the timing of the sequential selection and thinning-out a prescribed number of horizontal periods from a wide standard image signal; and means for controlling in an irregular manner the horizontal scanning means and the vertical scanning means, wherein a dark signal is written to remaining portions left-over at the top and bottom of the longitudinal direction of the screen at a faster speed than the speed of the image signal, when wide displaying.

* * * * *